(12) United States Patent
Nishiyama et al.

(10) Patent No.: US 8,861,116 B2
(45) Date of Patent: Oct. 14, 2014

(54) TRACK PITCH VARIATION MEASUREMENT METHOD USING SPIRAL DC PATTERN WRITING

(75) Inventors: Mao Nishiyama, Yamato (JP); Masafumi Mochizuki, Chigasaki (JP); Kyo Akagi, Fuchu (JP); Shuji Nishida, Fujisawa (JP); Kazunari Usui, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 405 days.

(21) Appl. No.: 13/196,022

(22) Filed: Aug. 2, 2011

(65) Prior Publication Data
US 2013/0033778 A1 Feb. 7, 2013

(51) Int. Cl.
| | |
|---|---|
| G11B 5/09 | (2006.01) |
| G11B 15/46 | (2006.01) |
| G11B 21/02 | (2006.01) |
| G11B 5/82 | (2006.01) |
| G11B 5/596 | (2006.01) |
| G11B 5/74 | (2006.01) |

(52) U.S. Cl.
CPC ............ *G11B 5/743* (2013.01); *G11B 5/59661* (2013.01); *G11B 5/59627* (2013.01)
USPC ............. 360/48; 360/73.09; 360/75; 360/135

(58) Field of Classification Search
None
See application file for complete search history.

(56) References Cited

U.S. PATENT DOCUMENTS

| | | |
|---|---|---|
| 4,504,939 A | 3/1985 | Eberly |
| 4,587,579 A | 5/1986 | Cocke et al. |
| 5,668,679 A | 9/1997 | Swearingen et al. |
| 7,088,533 B1 | 8/2006 | Shepherd et al. |
| 7,136,253 B1 | 11/2006 | Liikanen et al. |
| 7,499,236 B1 | 3/2009 | Lee et al. |
| 7,639,445 B2 | 12/2009 | Matsunaga et al. |
| 7,706,100 B2 | 4/2010 | Kawabe |
| 7,738,200 B2 | 6/2010 | Annampedu et al. |
| 7,773,335 B1 | 8/2010 | Adler et al. |
| 7,869,158 B1 * | 1/2011 | Cheung et al. ............. 360/77.07 |

(Continued)

FOREIGN PATENT DOCUMENTS

| | | |
|---|---|---|
| JP | 2007-287225 | 11/2007 |
| JP | 2010/033681 A | 2/2010 |

OTHER PUBLICATIONS

Suzuki et al., "A Method for Simultaneous Position and Timing Error Detection for Bit-Patterned Media," 2009 IEEE, IEEE Transactions on Magnetics, vol. 45, No. 10, Oct. 2009, pp. 3749-3752.

*Primary Examiner* — Daniell L Negron
(74) *Attorney, Agent, or Firm* — Zilka-Kotab, PC

(57) ABSTRACT

In one embodiment, a method includes spiral writing a DC pattern onto a magnetic disk medium using a writer of a magnetic head while moving the magnetic head in a direction about parallel to a radial direction of the magnetic disk medium while rotating the magnetic disk medium, reading the magnetic disk medium while moving the magnetic head in the direction about parallel to the radial direction of the magnetic disk medium while rotating the magnetic disk medium, and calculating a track pitch interval between data tracks of the magnetic disk medium based on the reading of the magnetic disk medium. In another embodiment, a magnetic disk medium includes a DC spiral pattern in a radial region further outward and/or a radial region further inward than a radial region where data is recorded.

20 Claims, 9 Drawing Sheets

(56) References Cited

U.S. PATENT DOCUMENTS

| | | | |
|---|---|---|---|
| 8,077,422 B1 * | 12/2011 | Ton-That et al. | 360/75 |
| 2004/0252394 A1 * | 12/2004 | Hamaguchi et al. | 360/48 |
| 2010/0123968 A1 | 5/2010 | Yoshida | |
| 2010/0232046 A1 * | 9/2010 | Annampedu et al. | 360/39 |

* cited by examiner

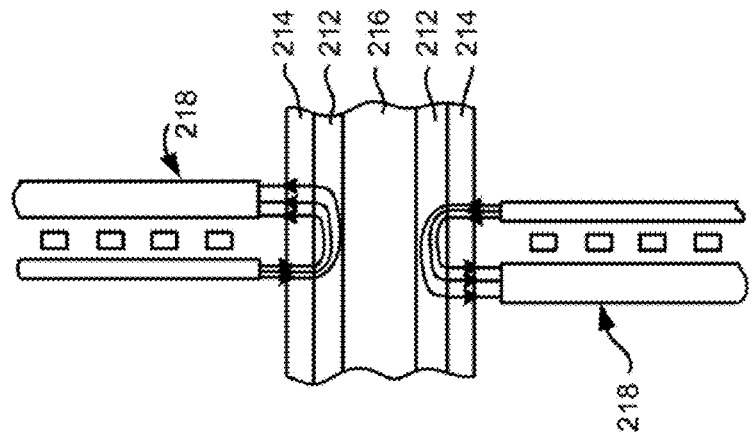
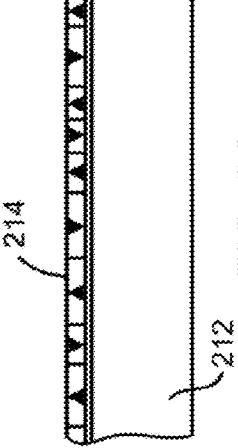
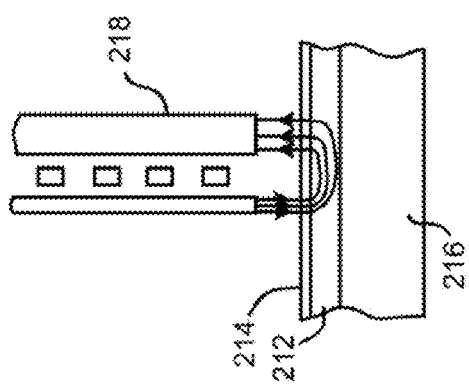
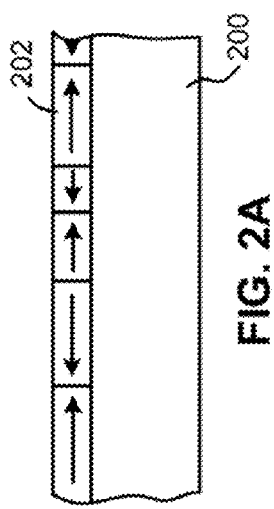
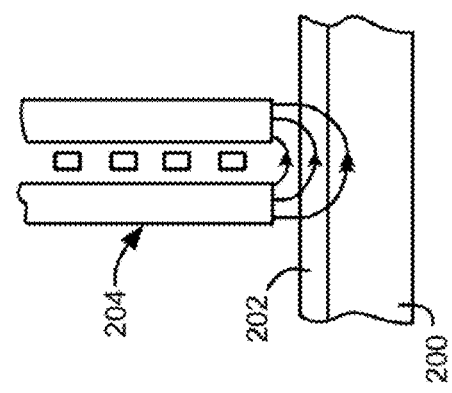

TRACK PITCH VARIATION MEASUREMENT METHOD USING SPIRAL DC PATTERN WRITING

FIELD OF THE INVENTION

The present invention relates to magnetic data storage systems, and more particularly, this invention relates to track pitch variation for discrete track media (DTM) and bit-patterned media (BPM) using spiral DC pattern writing.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. In discrete track media (DTM) and/or bit-patterned media (BPM), the variation in track pitch arises at the time of manufacture. In a magnetic data storage device, such as a HDD, position information indicating the position of the magnetic head over the medium is written on the surface thereof at constant circumferential intervals (this information is typically referred to as "servo information" and the regions containing this information are referred to as "servo sectors"), and a plurality of concentric tracks (track numbers 1 to $T_n$ (where $T_n$ is an integer)) are formed in which each circumference constitutes one track. The servo information is written on the magnetic disk medium using a dedicated servo track writer, self-servo write, or some other technique. Furthermore, in each track, the area from a certain servo sector to the following servo sector is allocated as a region for writing data (this is typically referred to as a data sector). Various kinds of information are written in the data sector using the magnetic disk device. That is, sectors wherein the minimum unit is a set comprising one servo sector and one data sector are continuously formed over each track.

The magnetic disk recorded in the device reads the position information servo sectors on the magnetic disk medium using a magnetic head, and a servo motor for positioning the magnetic head in the radial direction of the magnetic disk medium performs rotation control based on the difference from the read position thereof to the target position, whereby the magnetic head is made to reach the target position.

A continuous thin-film medium is conventionally used for the magnetic disk medium. Data is written to the continuous thin-film medium on which the servo information is recorded by moving the magnetic head to the servo sector belonging to the track number designated for data writing scanning the magnetic disk medium from that servo sector to a servo sector having a designated sector number by rotating the magnetic disk medium, and then generating a writing magnetic field using the magnetic head, from the latter stage of the designated servo sector to the following servo sector. It should be noted that the servo information in each servo sector contains burst information as correction information for each servo sector in order for the magnetic head to reach the center of the following servo sector, and the magnetic head reads out the correction information at each servo sector and performs fine adjustments to the position of arrival in the following servo sector so as to suppress positional offset in that servo sector. Furthermore, when data is read out, the magnetic head scans on the above track over the data sectors where data is written by the magnetic head on the same track, and the data which is magnetically written is reproduced from the magnetic head as electrical signals.

In the continuous thin-film medium, the servo sectors are formed by a servo track writer, etc., but the data sectors are formed without further processing on the movement path of the magnetic head which passes through the servo sectors under the above mentioned positional control, and the path thereof forms the tracks of the magnetic disk medium. This path will is typically referred to as the servo path, the servo sector portion within the tracks thereof is referred to as servo tracks, and the data sector portion is referred to as data tracks.

As described above, the servo sector information is recorded on the magnetic disk medium by a servo track writer. This involves processing which is carried out before product shipment, and therefore if the magnetic disk medium is formed before the device is actually shipped, a certain amount of variation will be produced in the positioning accuracy of the magnetic head in the servo sectors depending on the devices in which the magnetic disk medium has been installed. Consequently, the user suppresses the occurrence of positional offset of the magnetic head in the servo sector position by writing position correction information for suppressing variations in the device to a user writable region, referred to as an repeatable run-out (RRO) region, which is provided in the servo sectors.

For this reason, in order to make the write head on track, RRO should be rectified. However, conventional methods of measuring track pitch for each and every track of the media is not realistic.

SUMMARY

In one embodiment, a method includes spiral writing a DC pattern onto a magnetic disk medium using a writer of a magnetic head while moving the magnetic head in a direction about parallel to a radial direction of the magnetic disk medium while rotating the magnetic disk medium, reading the magnetic disk medium while moving the magnetic head in the direction about parallel to the radial direction of the magnetic disk medium while rotating the magnetic disk medium, and calculating a track pitch interval between data tracks of the magnetic disk medium based on the reading of the magnetic disk medium.

In another embodiment, a magnetic disk medium includes a DC spiral pattern in a radial region further outward and/or a radial region further inward than a radial region where data is recorded.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

Figure 1:
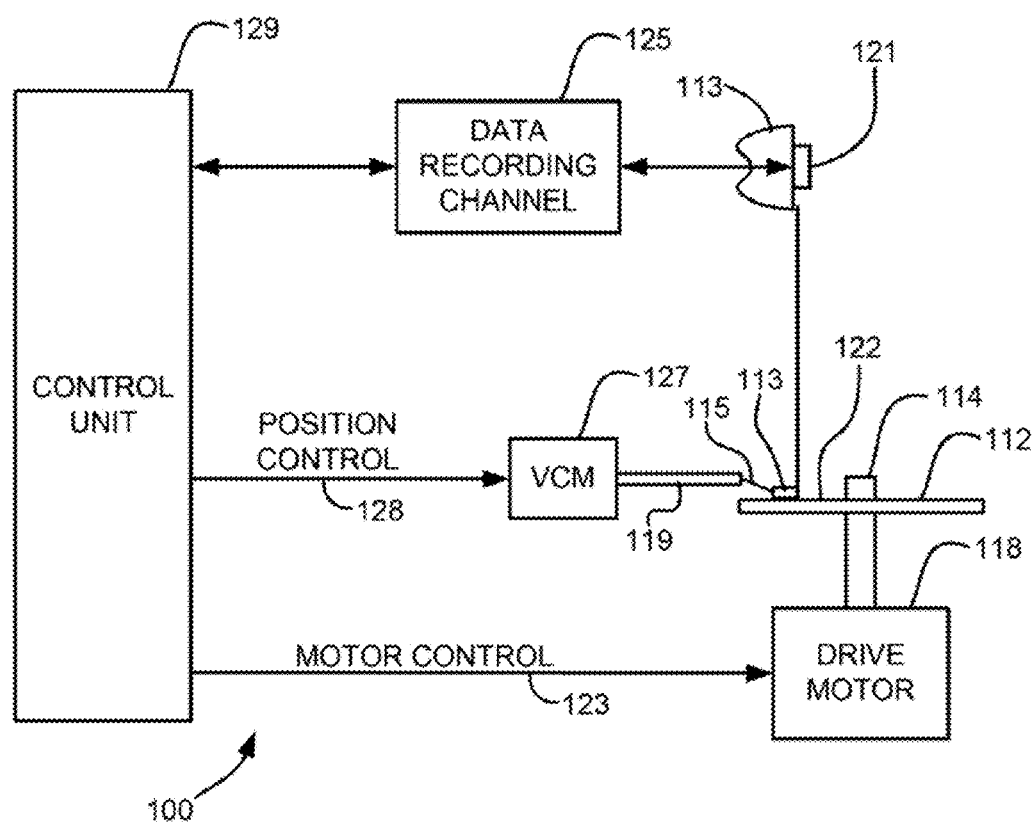
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method includes spiral writing a DC pattern onto a magnetic disk medium using a writer of a magnetic head while moving the magnetic head in a direction about parallel to a radial direction of the magnetic disk medium while rotating the magnetic disk medium, reading the magnetic disk medium while moving the magnetic head in the direction about parallel to the radial direction of the magnetic disk medium while rotating the magnetic disk medium, and calculating a track pitch interval between data tracks of the magnetic disk medium based on the reading of the magnetic disk medium.

In another general embodiment, a magnetic disk medium includes a DC spiral pattern in a radial region further outward and/or a radial region further inward than a radial region where data is recorded.

There has been striking progress in recent years in technology for improving recording density in magnetic disk media which are used in magnetic disk devices. At the same time, the distance between adjacent data has become smaller as recording density has increased, and therefore the effects of adjacent magnetization can no longer be ignored.

Systems for blocking the effects of adjacent magnetization by physically segmenting the magnetic disk medium have been proposed. One such adjacent magnetization in the cross track direction is referred to as discrete track recording (DTR). The magnetic disk media in these systems, referred to as discrete track media (DTM) have a structure in which adjacent tracks are physically divided by grooves. A further system which also aims to block the effects of adjacent magnetization in the track direction is referred to as bit-patterned recording (BPR), and in bit-patterned media (BPM) structures, adjacent sectors on each track are also physically divided. Furthermore, portions which are not grooves, in other words, portions where magnetic material is present to allow magnetic recording, are referred to as lands.

As described above, if a continuous thin-film medium is used as the magnetic disk medium, data sectors are formed in that state on the path of the magnetic head which has passed through the servo sector, and the path constitutes the tracks. That is, the data sectors are actually disposed at a position corresponding to the path of the magnetic head on the magnetic disk medium, even if that path is distorted and non-circular, for example. Furthermore, the controller for controlling the position of the magnetic head cannot detect if the magnetic head is tracing a distorted path with respect to the magnetic disk medium.

The servo information for indexing positioning is data which is modulated as amplitude information or phase information, and therefore the distortion of the servo path is produced in one case by superposition of noise, etc., during modulation when servo information is written to the servo sectors or during demodulation when the servo information is read out from the servo sectors.

It is essential for data to be written on the physical tracks formed by the lands, and therefore there are problems in that writing errors and reproduction errors occur if the servo path cannot follow the physical tracks.

With DTR, information from a repeatable run-out (RRO) region is used to keep the head on-track in the lands. This therefore presents the issue of how to search for the lands from data which is physically interrupted in DTR. If an extension of a conventional method is considered, the tracks are written one at a time, after which off-track reading is repeated. However, this is extremely time-consuming.

According to one embodiment, technology for making the servo path of a magnetic head which is positionally controlled in accordance with servo information recorded on a magnetic disk medium in a DTR system or BPR system (referred to below generically in abbreviated form as "DTR-BPR") follow a track formed between groups on the magnetic disk medium. Also, in some approaches, a method for measuring tracking information which causes the magnetic head to follow a track, and a positioning control device for controlling the magnetic head using the tracking information are provided.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/reproducing head 204, which may preferably be a thin film head, and a, conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

When the servo sectors are formed by a servo track writer, the servo sectors cannot actually be disposed in a perfect circle, and therefore the servo path formed includes distortions from a circular shape. That is to say, the servo path formed deviates from a perfect circle. In this case, DTR-BPR media, in which physical tracks are formed by the lands may be considered.

DTR-BPR media enable a method in which the servo information is formed as a pattern together with the lands, or the continuous thin-film region is left and servo sectors are written to that portion. The offset of the servo path is caused, among other things, by control offset of the magnetic head due to noise during modulation and demodulation of the servo information at the servo sector position, mechanical offset, and physical offset in the pattern formation.

On the other hand, the lands form a path which deviates from a circle because of physical offset reflected in the lands as a whole when they are formed. Consequently, the physical tracks formed by the lands and the tracks denoted by the servo path are consistent for the most part at the actual servo sector position on the magnetic disk medium, but offsets occur for independent reasons between servo sectors, and inconsistencies arise (that is to say, if the lands are considered as the base, the servo path deviates from the lands). Magnetic heads for reading and writing data operate according to the servo path, and therefore when DTR-BPR media are used, the magnetic head does not scan (travel) along the tracks formed by the lands in a consistent manner.

According to one embodiment, DC spiral patterning is written to a magnetic medium, the DC spiral pattern is detected, and a device is used to measure time intervals between the detected DC spiral pattern and a datum point set to each track. By converting the time into track pitch using an algorithm, as described in more detail later, a high speed and highly accurate calculation of the amount of RRO compensation of track pitch may be made.

Figure 3:
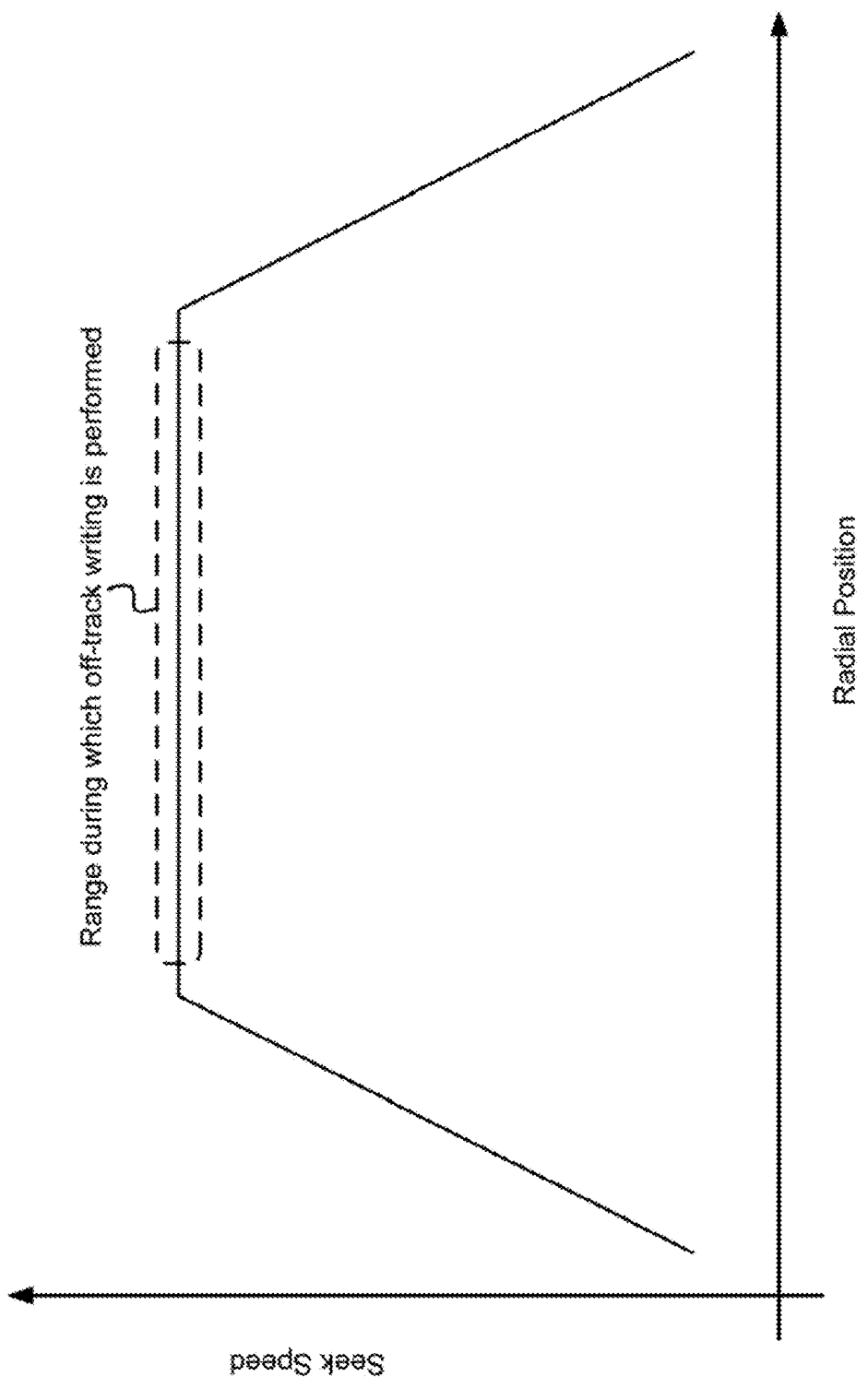
FIG. 3 is a plot showing a DC pattern writing time after the spindle motor has reaches speed, according to one embodiment.

In one embodiment, after it is confirmed that the spindle motor of the magnetic disk device has reached its rated speed, off-track writing is carried out, as shown in FIG. 3. Specifically, DC writing may be carried out by moving the recording head at a constant speed from the outermost circumference to the innermost circumference of the data tracks, or from the innermost circumference to the outermost circumference thereof, while the write gate is open.

Figure 4:
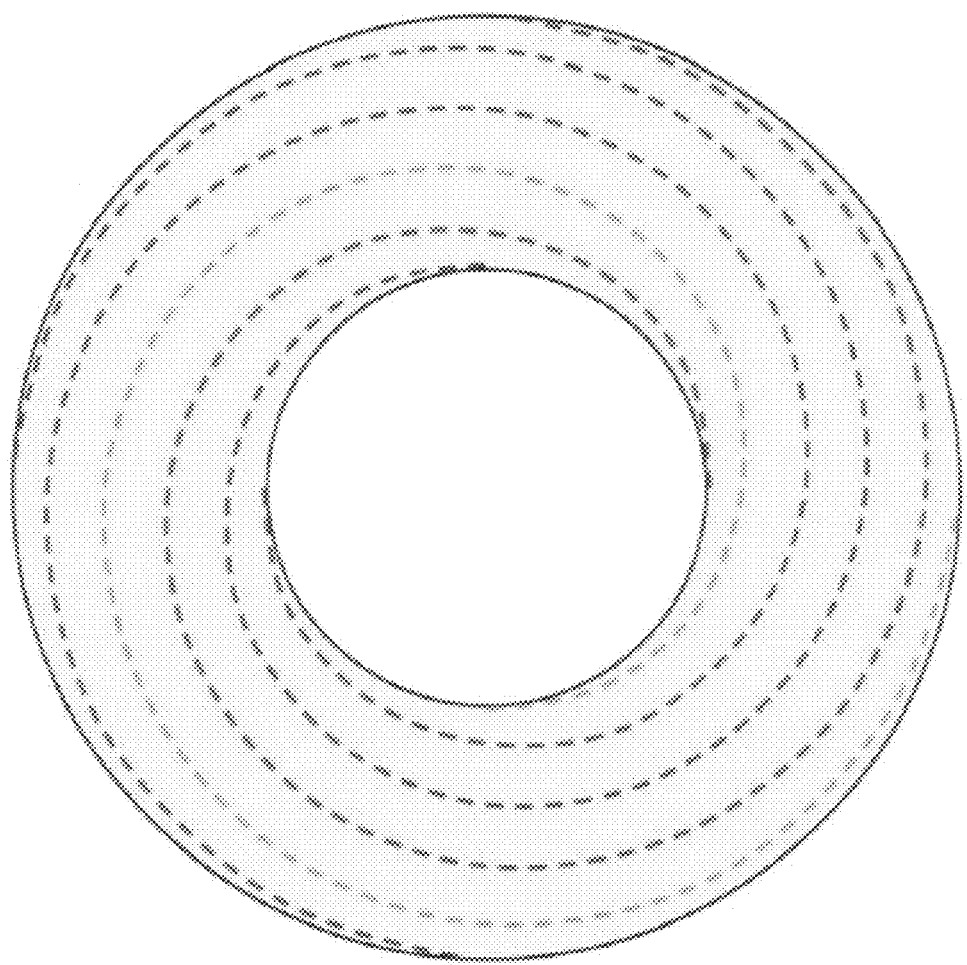
FIG. 4 is a DC pattern having a plurality of spirals written, according to one embodiment.

The recording head (writer) moves at a constant speed while the magnetic disk medium is rotated at a constant speed at the same time, and therefore a spiral DC pattern may be formed on the DTR-BPR magnetic disk medium, as shown in FIG. 4 according to one embodiment (as indicated by any of the dashed lines).

In one embodiment, the write gate remains open during all times except during the time when the recording head actually passes through the servo sector, at which point the write gate is closed. However, since this process involves a conventional method which is normally carried out, it is not described in detail here.

It should be noted that the DC spiral pattern is preferably written to a plurality of locations in order to correct AC pitch fluctuations and eccentricity, also as shown in FIG. 4 (as indicated by the various dashed lines).

Figure 5:
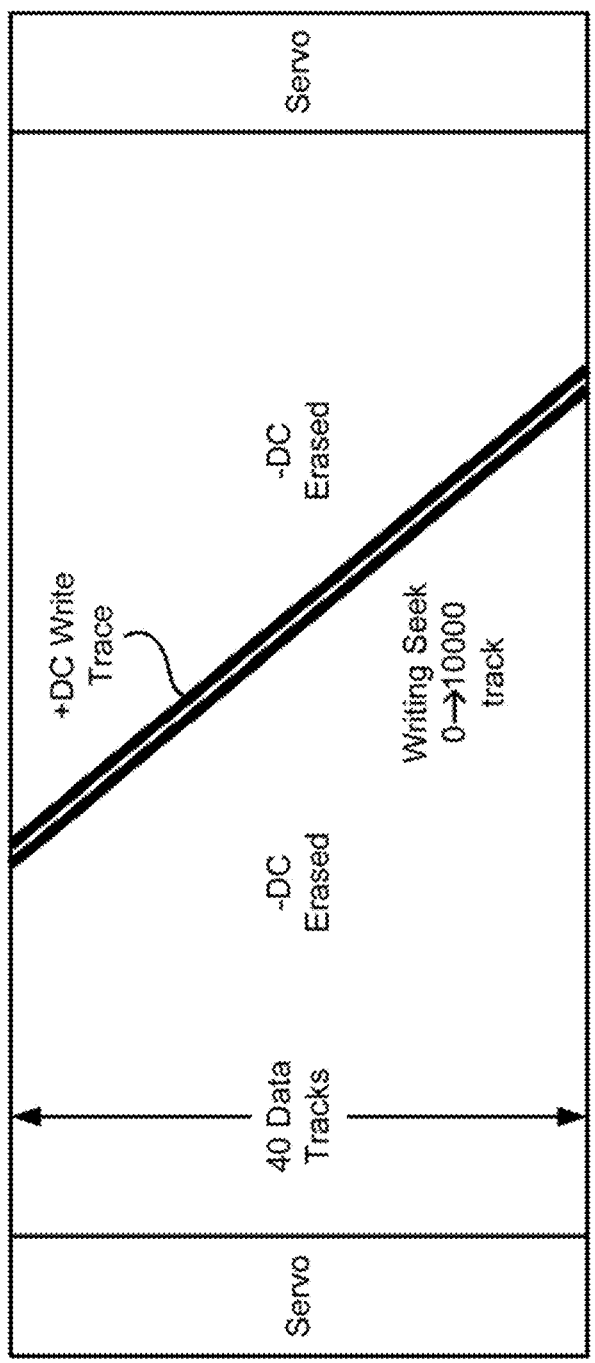
FIG. 5 shows an example of a DC pattern write, according to one embodiment.
Figure 6:
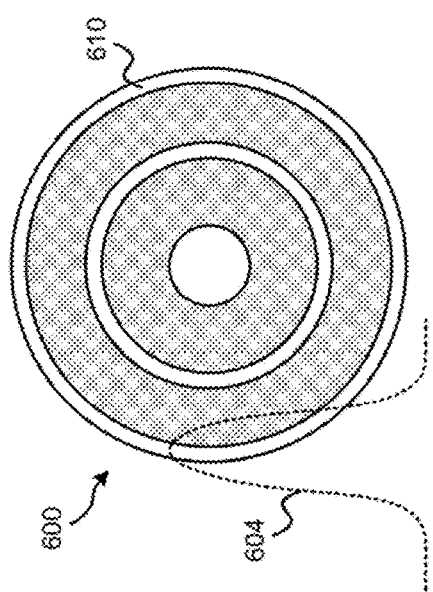
FIG. 6 shows a relationship between amp maximum value and track center, according to one embodiment.
Figure 7:
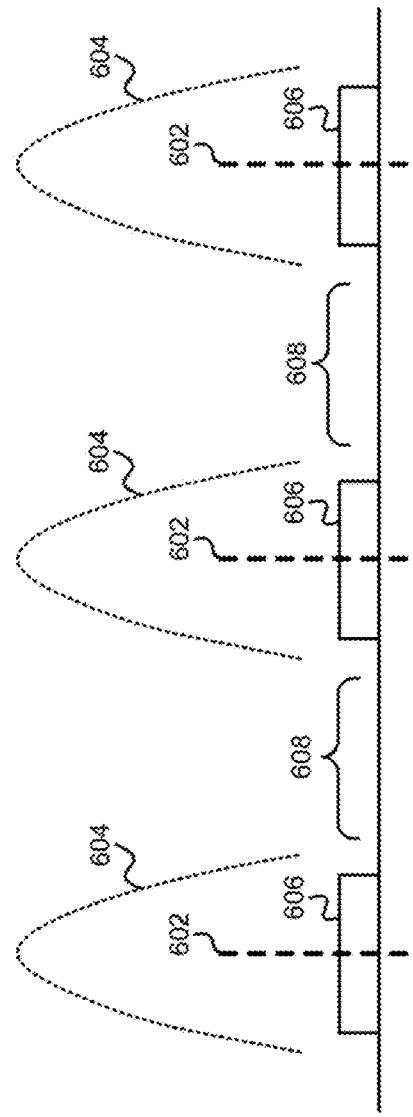
FIG. 7 shows the relationship between amp maximum value and track center, according to one embodiment.

According to a further embodiment, a method for detecting a DC pattern during off-track reading may be carried out, and the place where the amp output is at a maximum is determined to be the track center, as shown in FIGS. 5, 6, and 7, according to one embodiment. In FIG. 5, an example of a DC spiral pattern after being written is shown, and since the amp value is lower at areas farther from the track center, the DC spiral pattern may be detected by using a carry out off-track read and taking a maximum amp value as a center of each of the tracks.

FIG. 6 shows a relationship between the amp maximum value, as indicated by the curved plotline 604, and the center of the track 610, which in this example is the outer track of the disk 600. As can be seen, the track center is determined at a point where the amp maximum is reached.

FIG. 7 shows the relationship between the amp maximum value, as indicated by the curved plotlines 604, and the track center 602 of various tracks. Also, the tracks are shown on the lands 606, while grooves 608 are shown between the lands 606. As can be seen, the track center 602 is determined at a point where the amp maximum is reached.

A DC spiral pattern is formed by spiral writing a DC pattern onto a magnetic disk medium which supports a DTR-BPR recording system, and the RRO region thereof may be measured to determine its effectiveness, according to one embodiment. For this measurement, the write gate may be continuously opened, and the whole circumference may be DC spiral written. The position of the lands may be ascertained during reproduction (reading) by reading the DC pattern. When current RRO correction and the amount of time that the processes take are compared, it is ascertained that the time used for the methods described herein according to various embodiments is only 1/4.3 of that used for current RRO correction (as shown in Table 1).

TABLE 1

|  | Write | Read |
| --- | --- | --- |
| Current Extension (A) (Assumed) | Off-track write (search for land) | Off-track read * Number of writes |
| Time Calculation (A) | (11.1 ms*195215trk*256)/ 64pes | (11.1 ms*256/ 16pes)*195215*4 |
| Proposed Method (B) | DC write (correction of AC fluctuations, eccentricity) | Off-track read |
| Time Calculation (B) | 25 ms*16 | 11.1 ms*256/ 16pes*195215 |
| Time Required | A: 8676 seconds B: 0.4 second | A: 38.6 hours B: 9.6 hours |
| Difference (A/B) in Time Required | 21,690 times less | 4 times less |

As can be seen in Table 1, it takes presumably 21,690 times less time (0.4 second v. 8676 seconds) to write using the methods and systems described herein according to various embodiments versus typical writing methods (Current Extension). In addition, although the time savings are less impressive, it still takes presumably 4 times less time (9.6 hours v. 38.6 hours) to read using the methods and systems described herein according to various embodiments versus typical reading methods. Therefore, overall for a whole pass, it takes 9.6 hours using the methods and systems described herein according to various embodiments versus 41.0 hours using typical writing methods, which corresponds to about a 4.3 times improvement using the methods and systems described herein according to various embodiments. Of course, these times are exemplary only, and are not meant to be limiting on the invention in any manner.

With continued reference to Table 1, in the Current Extension (A), the number of times of writing multiplied by the writing of one track requires time. In contrast, in the Proposed Method (B) according to any embodiment described herein, only internal and external seek time multiplied by X (described later) is required. In addition, in the Current Extension (A), every off-track write needs to be read, and the time of the part which a read position overlaps increases. However, in the Proposed Method (B) according to any embodiment described herein, off-track read on all circumferences with equal pitch is sufficient, which saves time.

Figure 8:
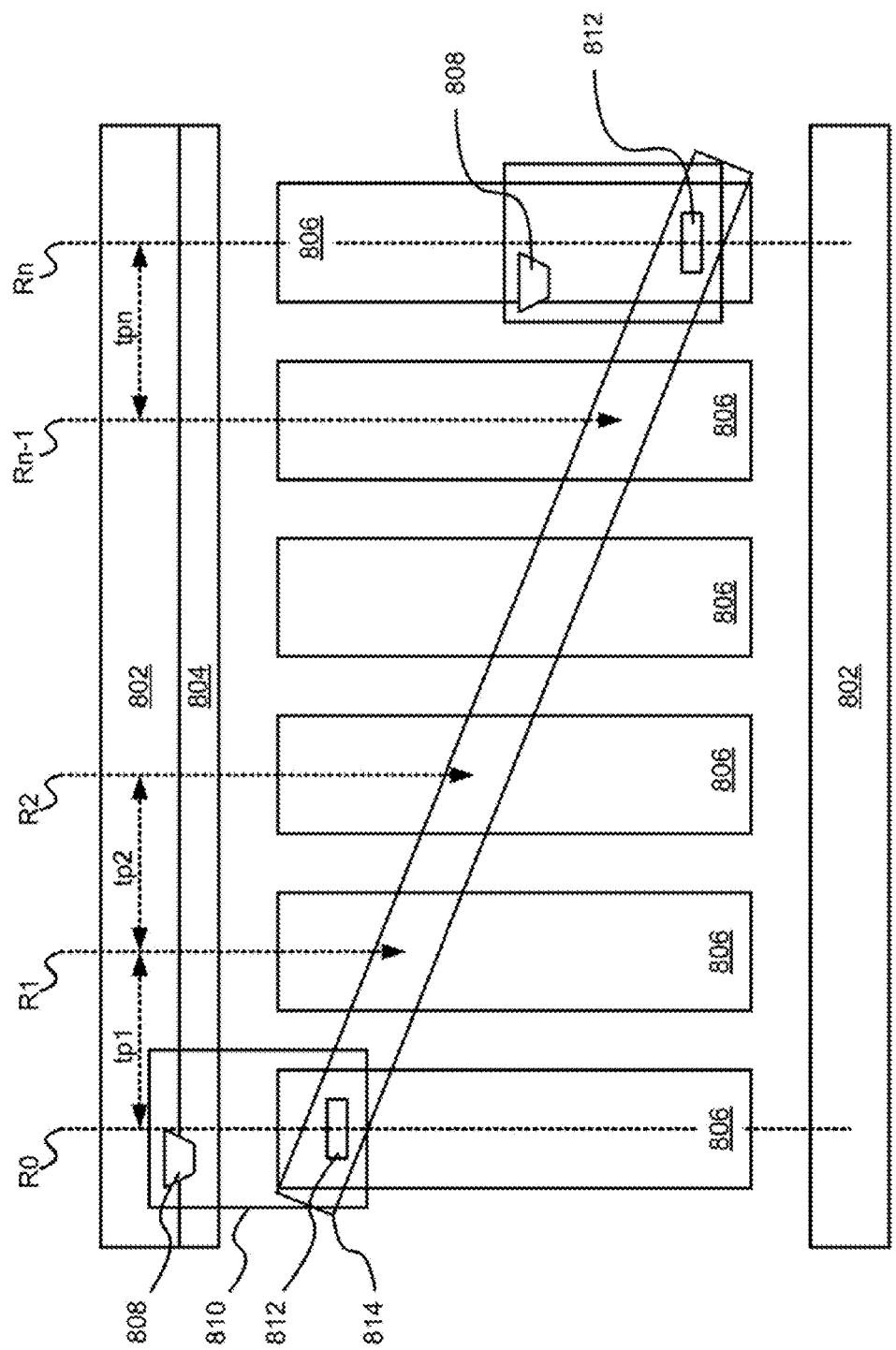
FIG. 8 shows RRO for reproduction head positioning, according to one embodiment.

Next, RRO for reproduction head positioning is discussed, which is also referred to as RRO for read. RRO for reproduction is described with the aid of FIG. 8, which shows DC pattern 814 recording (RRO for reproduction) according to one embodiment. Each magnetic head 810 includes a writer 808 and a reader 812, which may be offset physically from one another such that reading and writing may occur at the same time, in one embodiment. The DC pattern 814 straddles several hundred data tracks 806 from a first data track position R0 up to Rn, all within one servo sector (the area between servo tracks 802). The distance between the data tracks 806 is shown as tp1, tp2, ..., tpn. In this region, if the DC pattern 814 is written at a constant speed, the track pitch variation from the mean track pitch, in other words RRO for reproduction head positioning (RRO for read), which may be recorded to a RRO field area 804 in one embodiment, may be represented by Equation 1, presented below.

$$(TP-tp1), (2TP-(tp1+tp2)), \ldots, (nTP-\Sigma(tpn)) \quad \text{Equation 1}$$

Figure 9:
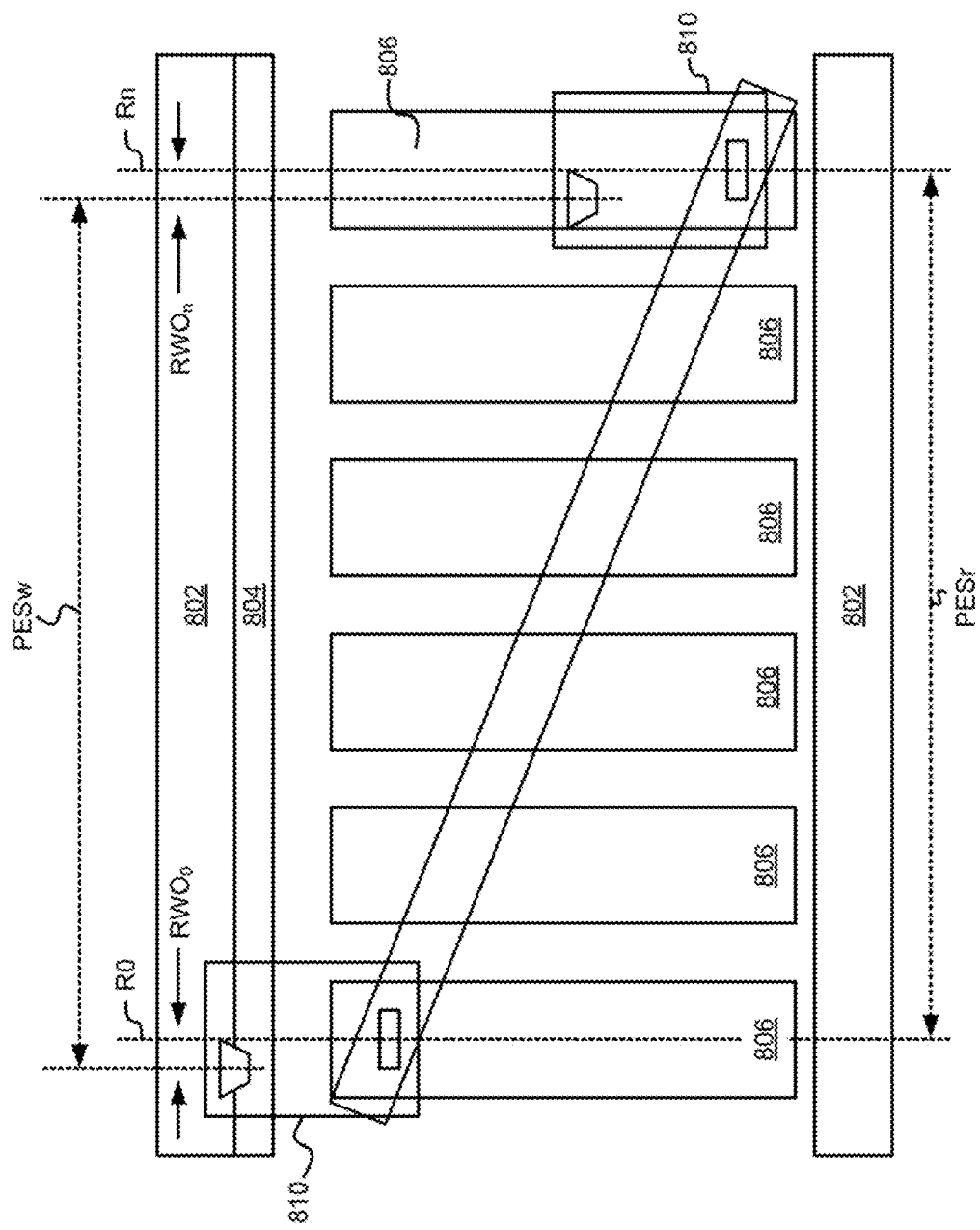
FIG. 9 shows RRO for recording head positioning, according to one embodiment.

RRO for recording head positioning, as referred to as RRO for write, is described with the aid of FIG. 9, which shows RRO for write according to one embodiment. The read/write offset (RWO) for each of R0, Rn is measured to obtain $RWO_0$, $RWO_n$. The movement distance of the magnetic head 810 which may be calculated as $PESw=PESr+RWO_0-RWO_n$, is obtained from $RWO_0$, $RWO_n$ and the movement distance PESr of the magnetic head from R0 to Rn.

When X=PESw/PESr is applied to the track pitch variation obtained as RRO for read, this becomes the RRO for write and is represented by Equation 2, presented below.

$$X(TP-tp1), X(2TP-(tp1+tp2)), \ldots, X(nTP-\Sigma(tpn)) \quad \text{Equation 2}$$

Figure 10:
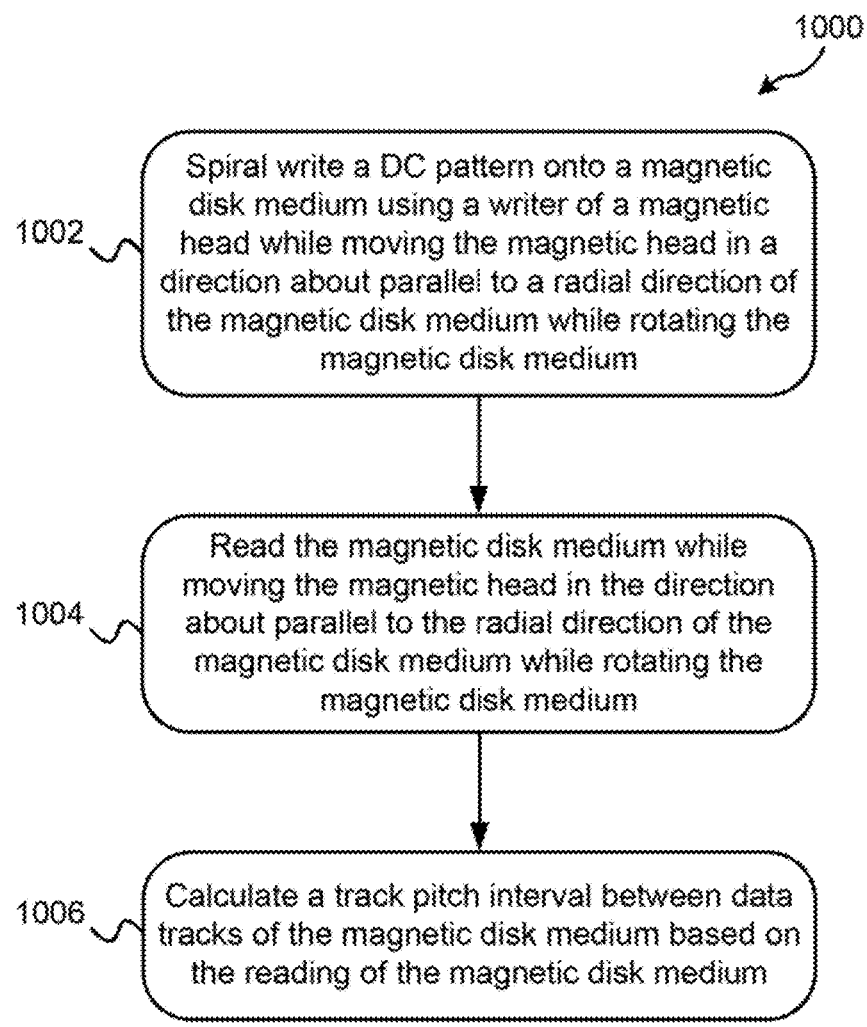
FIG. 10 shows a method according to one embodiment.

Now referring to FIG. 10, a method 1000 is shown according to one embodiment. The method 1000 may be carried out in any desired environment, including those shown in FIGS. 1-9, among others. The method 1000 may be used for producing a magnetic disk device, in one embodiment.

In operation 1002, a DC pattern is spiral written onto a magnetic disk medium using a writer of a magnetic head while moving the magnetic head in a direction about parallel to a radial direction of the magnetic disk medium while rotating the magnetic disk medium. As described above, this method of writing during scanning saves time over conventional methods.

In one approach, the direction about parallel to the radial direction of the magnetic disk medium indicates that the magnetic head is moved from an outer circumference of the magnetic disk medium inward in a direction normal to the data tracks of the magnetic disk medium, or the magnetic head is moved from an inner circumference of the magnetic disk medium outward in a direction normal to the data tracks of the magnetic disk medium.

In operation 1004, the magnetic disk medium is read while the magnetic head is moved in the direction about parallel to the radial direction of the magnetic disk medium while rotating the magnetic disk medium.

According to one embodiment, the magnetic head may be moved at a constant speed. In this or any other embodiment, the magnetic disk medium may be moved at a constant speed, thereby producing a recognizable spiral pattern.

In one approach, the magnetic disk medium may be read using off-track reading, which means that the disk is rotated and the magnetic head is moved across the magnetic disk medium from an inner circumference of the magnetic disk medium to an outer circumference of the magnetic disk medium, or vice versa, thereby allowing the magnetic head to move across each data track of the magnetic disk medium in each servo sector.

In one embodiment, the magnetic disk medium may be read to detect the DC spiral pattern. In a further embodiment, the magnetic disk medium may be read to detect intersections between the DC spiral pattern and data tracks of the magnetic disk medium.

In one approach, an output of a read channel of the magnetic head may be sensed. Each of the intersections between the DC spiral pattern and data tracks may occur at a point on the magnetic disk medium where the output of the read channel is at a maximum.

According to a preferred embodiment, the spiral writing and the reading may be performed substantially simultaneously, e.g., the reading and the writing may occur at the same time, but not necessarily exactly at the same time, as reading and writing may be offset, overlayed, incongruous, etc., and the invention is not meant to be limited to reading and writing at exactly the same time.

In another embodiment, the reading and the writing may be performed using the same magnetic head. The magnetic head may comprise a writer and a reader that are offset from one another physically, such that reading and writing may be performed at the same time on separate physical locations of the magnetic disk medium.

In operation 1006, a track pitch interval between data tracks of the magnetic disk medium is calculated based on the reading of the magnetic disk medium.

According to one embodiment, the DC spiral pattern is written to a plurality of locations in order to correct AC pitch fluctuations and eccentricity when reading from or writing to the magnetic disk medium which may not be detected when writing the DC pattern in only a single position.

In another embodiment, the DC spiral pattern may be written on the magnetic disk medium in a radial region that is further outward or a radial region that is further inward than a radial region where data is recorded on the magnetic disk medium.

In another embodiment, a magnetic data storage system, such as that described in FIG. 1 comprises at least one magnetic head 121, a magnetic disk medium 112 as described herein according to any embodiment, a drive mechanism 114/118 for passing the magnetic disk medium 112 over the at least one magnetic head 121, and a controller 129 electrically coupled to the at least one magnetic head 121 for controlling operation of the at least one magnetic head 121.

The magnetic disk medium 112 may comprise a DC spiral pattern in a radial region further outward and/or a radial region further inward than a radial region where data is recorded.

In another approach, the DC spiral pattern may be written to a plurality of locations in order to correct AC pitch fluctuations and eccentricity when reading from or writing to the magnetic disk medium 112.

In any embodiment described hereinabove, the magnetic disk medium 112 may be a DTM or a BPM, as described previously.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
spiral writing a DC pattern onto a magnetic disk medium using a writer of a magnetic head while moving the magnetic head in a direction about parallel to a radial direction of the magnetic disk medium while rotating the magnetic disk medium;
reading the magnetic disk medium while moving the magnetic head in the direction about parallel to the radial direction of the magnetic disk medium while rotating the magnetic disk medium; and
calculating a track pitch interval between data tracks of the magnetic disk medium based on the reading of the magnetic disk medium.

2. The method as recited in claim 1, wherein the DC spiral pattern is written to a plurality of locations in order to correct AC pitch fluctuations and eccentricity when reading from or writing to the magnetic disk medium.

3. The method as recited in claim 1, wherein the magnetic disk medium is read to detect the DC spiral pattern.

4. The method as recited in claim 1, wherein the magnetic disk medium is rotated at a constant speed during reading and/or writing of the magnetic disk medium.

5. The method as recited in claim 1, wherein the magnetic head is moved at a constant speed during reading and/or writing of the magnetic disk medium.

6. The method as recited in claim 1, wherein the reading of the magnetic disk medium detects intersections between the DC spiral pattern and data tracks of the magnetic disk medium.

7. The method as recited in claim 6, further comprising sensing an output of a read channel of the magnetic head during reading of the magnetic disk medium, wherein each of the intersections between the DC spiral pattern and data tracks occurs at a point on the magnetic disk medium where the output of the read channel is at a maximum.

8. The method as recited in claim 1, wherein the magnetic disk medium is read using off-track reading.

9. The method as recited in claim 1, wherein the DC spiral pattern is written on the magnetic disk medium in a radial region that is further outward and/or a radial region that is further inward than a radial region where data is recorded on the magnetic disk medium.

10. The method as recited in claim 1, wherein the magnetic disk medium is a bit-patterned medium (BPM).

11. The method as recited in claim 1, wherein the magnetic disk medium is a discrete track medium (DTM).

12. The method as recited in claim 1, wherein the spiral writing and the reading are performed simultaneously.

13. The method as recited in claim 1, wherein a write gate is kept open during the DC writing.

14. A magnetic disk medium, comprising a DC spiral pattern in a radial region further outward and/or a radial region further inward than a radial region where data is recorded, the DC spiral pattern having a longitudinal direction misaligned from a longitudinal direction of a servo sector closest thereto.

15. The magnetic disk medium as recited in claim 14, wherein the DC spiral pattern is written to a plurality of locations in order to correct AC pitch fluctuations and eccentricity when reading from or writing to the magnetic disk medium.

16. The magnetic disk medium as recited in claim 14, wherein the magnetic disk medium is a bit-patterned medium (BPM).

17. The magnetic disk medium as recited in claim 14, wherein the magnetic disk medium is a discrete track medium (DTM).

18. A magnetic data storage system, comprising:
at least one magnetic head;
the magnetic disk medium as recited in claim 14;
a drive mechanism for passing the magnetic disk medium over the at least one magnetic head; and
a controller electrically coupled to the at least one magnetic head for controlling operation of the at least one magnetic head.

19. The system as recited in claim 18, wherein the controller is configured to cause DC writing of the DC spiral pattern by keeping a write gate open during the DC writing.

20. The system as recited in claim 18, wherein the controller is configured to cause spiral writing and reading to be performed simultaneously.

* * * * *